(12) United States Patent
Canale

(10) Patent No.: US 8,567,825 B2
(45) Date of Patent: Oct. 29, 2013

(54) TELESCOPIC EXTENSION, IN PARTICULAR FOR A HOUSEHOLD APPLIANCE, AND ASSOCIATED HOUSEHOLD APPLIANCE

(75) Inventor: Stefano Canale, Gorla Minore (IT)

(73) Assignee: OMEC S.p.A., Gorla Minore (VA) (IT)

( * ) Notice: Subject to any disclaimer, the term of this patent is extended or adjusted under 35 U.S.C. 154(b) by 0 days.

(21) Appl. No.: 13/208,643

(22) Filed: Aug. 12, 2011

(65) Prior Publication Data

US 2012/0126533 A1    May 24, 2012

(30) Foreign Application Priority Data

Aug. 13, 2010   (IT) .............................. MI2010A1549

(51) Int. Cl.
*F16L 39/04*      (2006.01)

(52) U.S. Cl.
USPC .............................. 285/302; 285/7

(58) Field of Classification Search
USPC .................. 285/7, 302, 303; 15/414
See application file for complete search history.

(56) References Cited

U.S. PATENT DOCUMENTS

| | | | |
|---|---|---|---|
| 5,332,266 A | 7/1994 | Canale | 285/7 |
| 6,148,474 A * | 11/2000 | Ohara et al. | 285/7 |
| 6,435,754 B1 | 8/2002 | Canale | 403/109.2 |
| 6,454,308 B1 | 9/2002 | Kim | 285/7 |
| 6,474,696 B1 * | 11/2002 | Canale | 285/7 |
| 6,494,492 B1 * | 12/2002 | Ha | 285/7 |
| 6,832,784 B1 * | 12/2004 | Chen | 285/7 |
| 7,025,383 B2 | 4/2006 | Canale | 285/7 |
| 7,883,116 B2 | 2/2011 | Canale | 285/7 |
| 8,038,173 B2 * | 10/2011 | Canale | 285/7 |
| 2011/0018257 A1 * | 1/2011 | Jeon et al. | 285/303 |

FOREIGN PATENT DOCUMENTS

| | | |
|---|---|---|
| EP | 0 987 976 B1 | 3/2002 |
| EP | 1 333 747 B1 | 4/2006 |
| EP | 1 875 849 A2 | 1/2008 |
| EP | 1 092 383 B1 | 5/2008 |
| EP | 2 001 348 B1 | 12/2009 |
| GB | 2 416 679 A | 2/2006 |
| WO | 02/18802 A1 | 3/2002 |
| WO | 2005/085659 A1 | 9/2005 |

OTHER PUBLICATIONS

IT Search Report mailed Jan. 13, 2011 in IT application MI20101549.

* cited by examiner

*Primary Examiner* — David E Bochna
(74) *Attorney, Agent, or Firm* — Nixon & Vanderhye, P.C.

(57) ABSTRACT

A telescopic extension for a household appliance comprises: an inner tube and outer tube, with the inner and outer tubes being telescopically slidable with respect to each other A constraining device is configured so as to block sliding of the inner tube with respect to the outer tube An actuating device is operatively connected to a slider. The actuating device comprises a substantially cylindrical body fitted on at least part of the outer surface of the outer tube. The substantially cylindrical body comprises at least one opening positioned to expose a surface of the outer tube whereby grip of user on the substantially cylindrical body may also contact the exposed surface of the outer tube and lock the cylindrical body with respect to the outer tube.

12 Claims, 5 Drawing Sheets

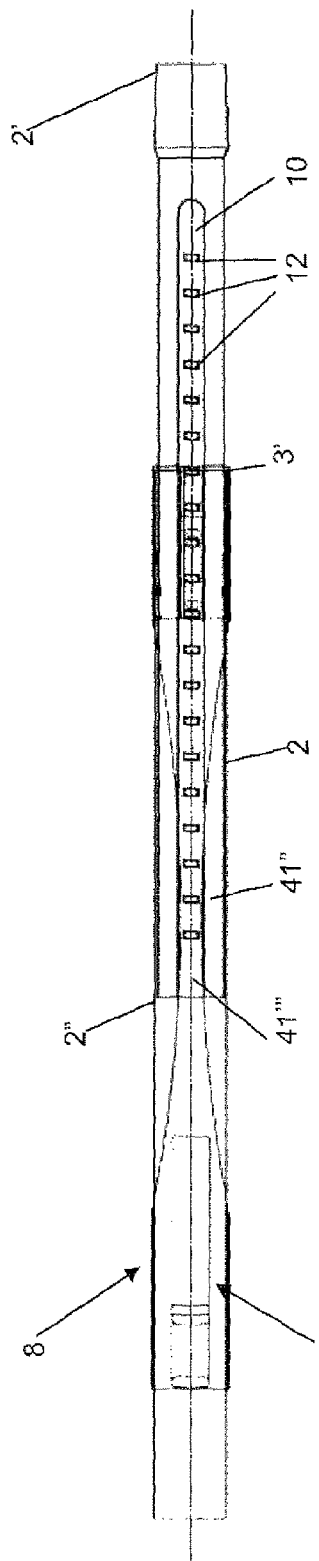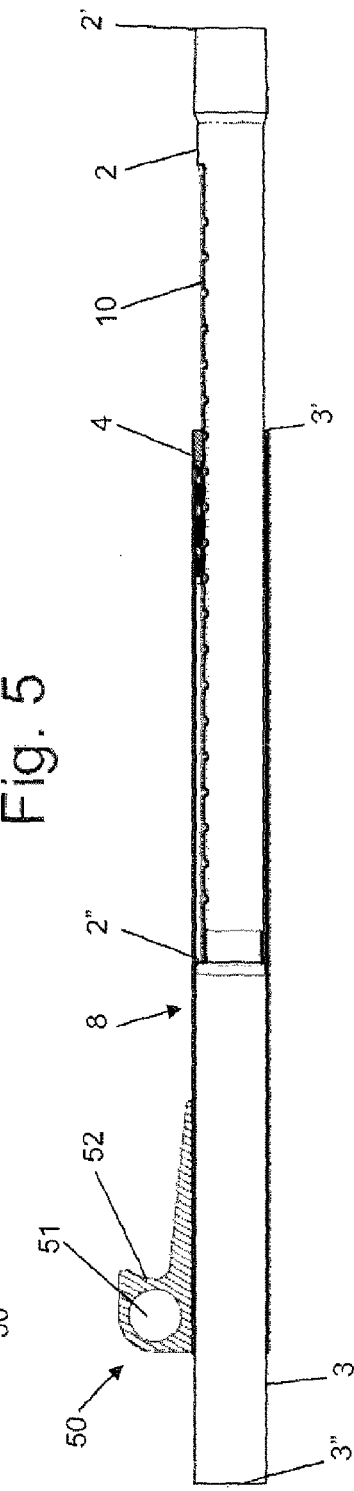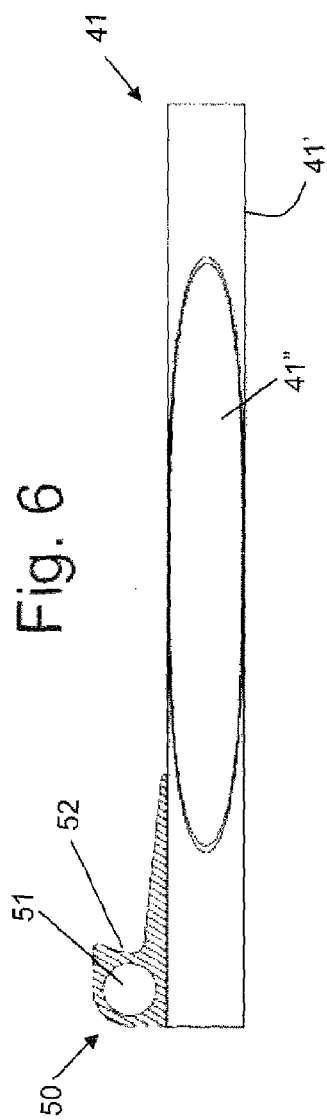
Fig. 5
Fig. 6
Fig. 12

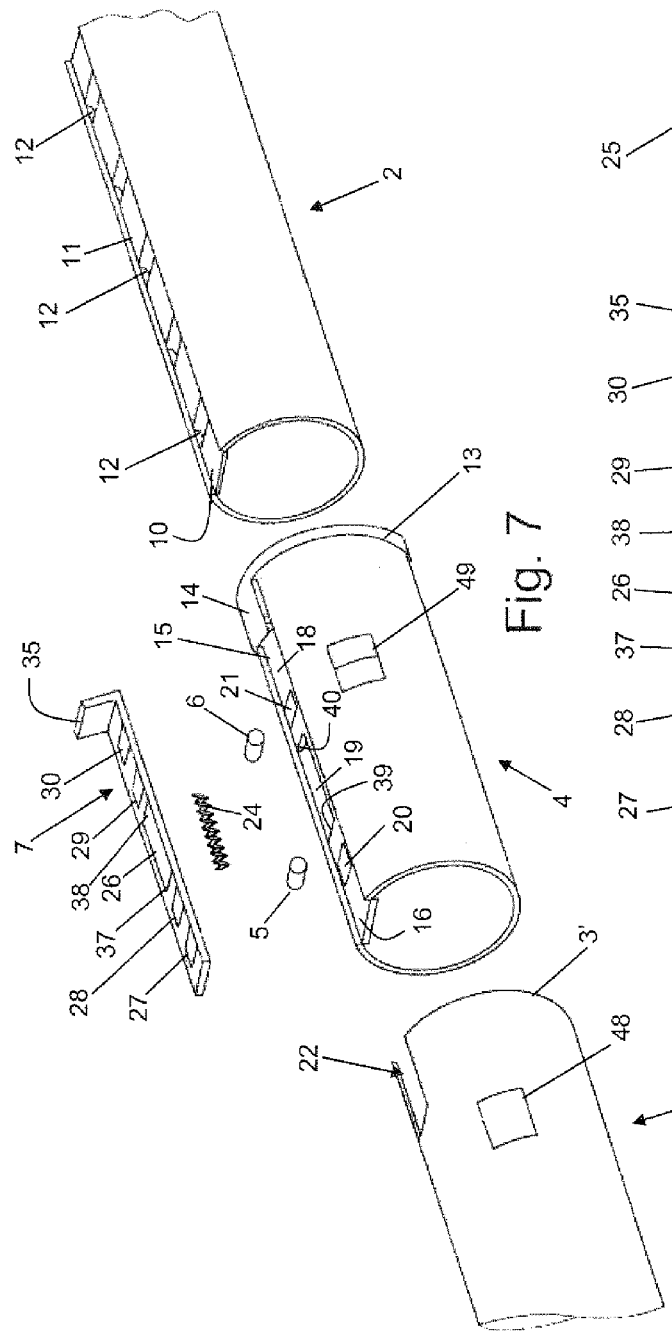

TELESCOPIC EXTENSION, IN PARTICULAR FOR A HOUSEHOLD APPLIANCE, AND ASSOCIATED HOUSEHOLD APPLIANCE

This claims priority to Italian Patent Application No. MI2010A 001549 filed 13 Aug. 2010, the entire content of which is hereby incorporated by reference.

The technology disclosed herein relates to a telescopic extension, in particular for a household appliance, such as a vacuum cleaner, a drum vacuum cleaner, an electric broom, a carpet cleaner or a cyclonic vacuum cleaner, for a centralized suction system or a similar apparatus. The technology disclosed herein also relates to a household appliance comprising such a telescopic extension.

Telescopic extensions for household appliances are known, said extensions comprising an inner tube and an outer tube which are sealingly slidable one inside the other, a sleeve, a constraining device capable of fixing together (locking) the inner tube and the outer tube, a push-slider engaging with the constraining device via elastic means, and an actuating device operatively connected to the push-slider. In these known telescopic extensions, the inner tube is provided with a row of notches of predefined shape, the sleeve is fixed to the outer tube and the constraining device and the push-slider are movably mounted inside said sleeve. Said sleeve also houses the elastic means.

The push-slider acts on the constraining device via the elastic means. It forces the constraining device to remain inside a notch of the inner tube so as to block the inner tube inside the outer tube.

The actuating device is in turn configured so as to disengage the push-slider from the constraining device so as to leave the constraining device free to move radially and come out from a notch of the inner tube. In this way the inner tube is disengaged from the outer tube and may be slid relative to the outer tube in order to adjust the length of the extension.

In order to house said sleeve, some conventional telescopic extensions have an outer tube provided with a flaring (widened portion). Alternatively, the locking and release slider is mounted on a raised portion of the sleeve, housed inside a niche formed in the outer tube by means of deep-drawing.

EP 1,092,383 describes a telescopic extension for a household appliance.

Depending on the direction of suction in a telescopic extension, an inlet end and an outlet end are identified. The inlet end is typically fixed in a removable manner to a suction tool such as a so-called vacuum-cleaning brush or nozzle. The brush passes over the surface to be cleaned and sucks up solids or liquids such as dust, dirt, crumbs or water. The material sucked up from the ground enters into the telescopic extension via the inlet end and exits from the telescopic extension via the outlet end. Downstream of the telescopic extension, the material sucked up from the ground is collected, passing in some cases through another tube, for example a rigid or flexible tube of the coiled type.

Similarly, depending on the suction direction, likewise an inlet end and an outlet end are also defined for the inner tube and outer tube. In fact, the inlet end of the inner tube corresponds to the inlet end of the telescopic extension and the outlet end of the outer tube coincides with the outlet end of the telescopic extension.

In known telescopic extensions the sleeve, the constraining device and the corresponding actuating device are situated substantially close to the inlet end of the outer tube.

The vacuum cleaner is used by gripping the telescopic extension close to its outlet end and directing the suction tool towards the surfaces to be cleaned. Alternatively, in other models, an actual grip is provided close to the second end of the telescopic extension or downstream thereof. In this case, the grip and not the end of the telescopic extension is taken hold of. In order to slide the inner tube relative to the outer tube, the user must hold the inner tube with one hand. With the other hand the user must push (or pull) the pushbutton and push (or pull) the outer tube relative to the inner tube. The inventor has noticed that the aforementioned operation for lengthening or shortening a telescopic extension involves the use of both hands.

Moreover, the inventor has noticed that the aforementioned operation for lengthening or shortening a telescopic extension is performed by the user bending downwards in order to be able to reach the pushbutton with one hand. Alternatively, in order to avoid bending down, the operation is performed by raising the cleaning tool from the ground in order to move the pushbutton of the telescopic extension towards one hand.

The use of both hands is certainly inconvenient and in some cases even impossible if one of the user's hands is occupied (for example holding the power supply cable or some other object such as a telephone) or injured and therefore not able to be used. Also the fact of having to bend over is inconvenient and in some cases impossible for example in the case of elderly people or persons suffering from certain health problems.

EP 1 875 849 A2 discloses a wand arrangement for a vacuum cleaner. The arrangement comprises an actuator for operating a catch and linkage means extending from the catch to the trigger, wherein the actuator is pivotable about an axis and operable to engage the linkage means and move the linkage means from a first position to a second position in which the catch is released.

GB 2 416 679 A discloses a vacuum cleaner including a first wand section, a second wand section, a wand lock for securing the two wand sections together and a trigger actuator for operating the wand lock. The trigger actuator is located remote from the wand lock on the wand assembly. The trigger actuator is connected to the wand lock via a linkage which consists of a crank and a link arm.

The inventor has realized that the arrangements of EP 1 875 849 and of GB 2 416 679 comprise linkage means. Such linkage means are bulky and increase the whole diameter of the wand arrangement. In addition, after a number of actuations, the linkage means become loose and are unable to operate precisely. In addition, such arrangements are rather complicated and therefore expensive.

BRIEF SUMMARY

The telescopic extension according to the technology disclosed herein comprises an actuating device cooperating so as to leave the constraining device free to move radially and out of one notch of the inner tube. According to the technology disclosed herein, this actuating device extends from a position close to the inlet end of the outer tube into a position close to the outlet end of this outer tube so that it may be actuated using only one hand, i.e. the same hand used to grip the telescopic extension. The actuating device of the technology disclosed herein may be a substantially cylindrical body fitted on at least part of the outer surface of said outer tube. Such a substantially cylindrical body is concentric with the outer tube and has a diameter slightly higher than the diameter of the outer tube. Therefore, it can slide over the outer tube with very limited play. The substantially cylindrical body has a thin wall and therefore the increase of diameter of the whole arrangement is extremely reduced.

In the present description and in the claims a "position close to the inlet end of the outer tube" is considered to be a position which is situated at no more than about 10 cm, preferably less than 8 cm, and even more preferably less than about 5 cm, from the inlet end of the outer tube. Similarly, a "position close to the outlet end of the outer tube" is considered to be a position which is situated at no more than about 10 cm, preferably less than 8 cm, and even more preferably less than about 5 cm, from the outlet end of the outer tube.

According to a first aspect, the technology disclosed herein provides a telescopic extension comprising:
- a) an inner tube;
- b) an outer tube,
    - wherein said inner tube and said outer tube are telescopically slidable with respect to each other,
    - wherein said inner tube comprises a plurality of deformations of predefined shape on its outer surface;
- c) a constraining device which is configured so as to block sliding of the inner tube (2) with respect to the outer tube (3) when said constraining device is at least partially into one of said deformations;
- d) a slider and elastic means, wherein said slider cooperates with said constraining device by means of said elastic means; and
- e) an actuating device operatively connected to said slider, wherein said actuating device extends over at least half the length of said outer tube, wherein said actuating device comprises a substantially cylindrical body fitted on at least part of the outer surface of said outer tube.

In embodiments of the technology disclosed herein, the actuating device extends over at least 80% of the length of said outer tube, as far as a position close to an outlet end of the outer tube.

In embodiments of the technology disclosed herein, said substantially cylindrical body has a lateral surface which corresponds to a lateral surface of said outer tube, wherein the lateral surface of the substantially cylindrical body comprises at least one opening.

In embodiments of the technology disclosed herein, there may be two openings which are arranged symmetrically with respect to an axial plane of said outer tube.

Each of said two openings may be elongate in a longitudinal direction. For instance, each opening could be elliptical shaped.

In alternative embodiments of the technology disclosed herein, the actuating device may comprise a first annular band which is arranged at the inlet end of the outer tube and is operatively connected to said slider and a second annular band which is arranged at the outlet end of the outer tube, the first and second annular bands being connected by one or more connection bars, profitably adhering to the surface of the outer tube.

In embodiments of the technology disclosed herein, the actuating means also comprises a gripping device capable of being engaged by at least one portion of a hand of the person using the telescopic extension.

The gripping device may comprise one or more of the following: a buttonhole, a ring, a trigger, an eyelet or a rim projecting radially outwards.

Profitably, the outer tube is a tube having a cross section with a substantially constant diameter.

In embodiments of the technology disclosed herein, the substantially cylindrical body has a thickness of between about 0.5 mm and about 5 mm and a diameter which is substantially constant through its length. The outer diameter of the outer tube may substantially correspond to the inner diameter of the substantially cylindrical body. The actuating device does not substantially increase the diameter of the extension.

The substantially cylindrical body may be formed in a single piece or by two half substantially cylindrical shells which are connected together.

According to a further aspect, the technology disclosed herein provides a household appliance comprising a telescopic extension as set forth above.

BRIEF DESCRIPTION OF THE DRAWINGS

The technology disclosed herein will become clear from the following detailed description of examples of embodiments, to be read with reference to the accompanying drawings in which:

FIG. 5 is a top plan view of the extension according to FIG. 1;

FIG. 6 is a side view of the extension according to FIG. 1;

FIG. 7 is an exploded view of the extension according to FIG. 1;

FIG. 8 is a top plan view of a push-slider of the extension according to FIG. 1;

FIGS. 9, 10 and 11 are views, respectively, from below, the left-hand side and the right-hand side of the slider according to FIG. 8;

FIG. 12 is a view of solely the actuating device according to an embodiment of the technology disclosed herein;

DETAILED DESCRIPTION

Figure 1:
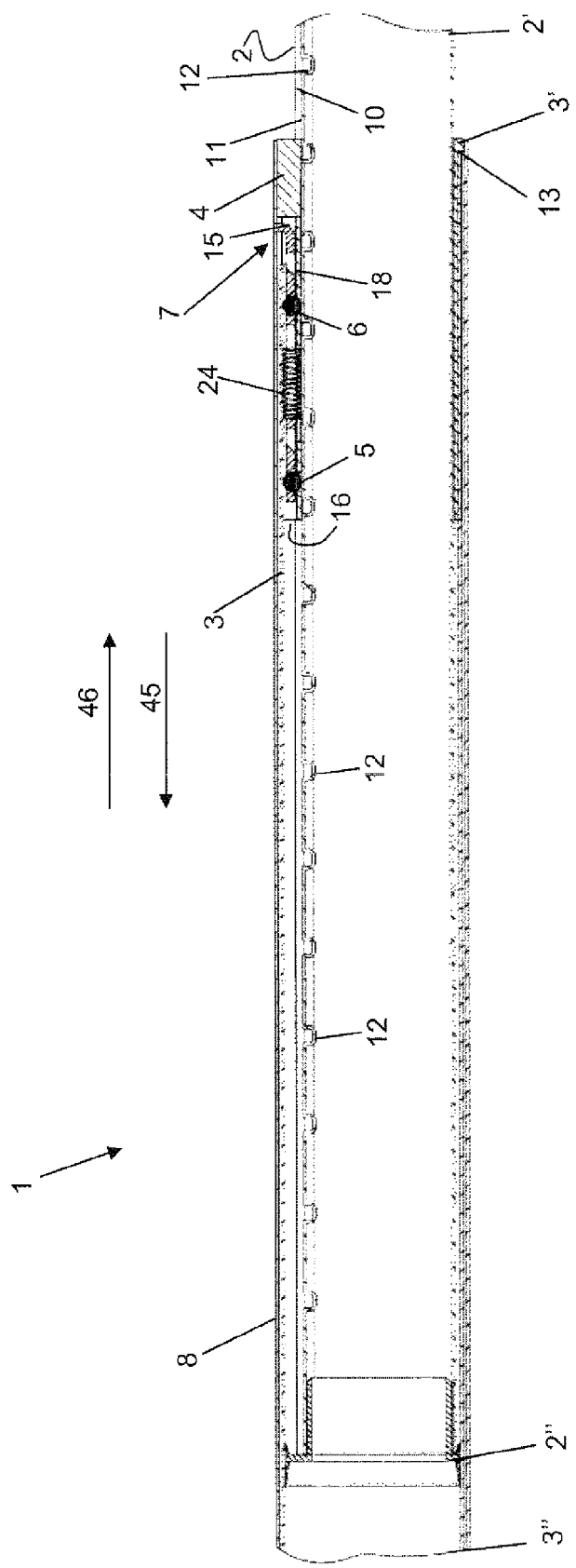
FIG. 1 is a longitudinally sectioned view of a portion of a telescopic extension, for example for a household appliance, designed according to the technology disclosed herein.
Figure 2:
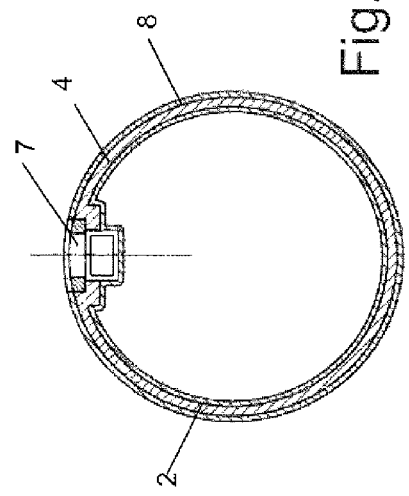
FIG. 2 is a cross-sectional view along the plane indicated by II-II in FIG. 1.

For the sake of completeness of the description, by way of a non-limiting example, a complete telescopic extension is described in detail. However, the principles of technology disclosed herein are also applicable to a telescopic extension with a different system for blocking relative sliding of the inner tube and the outer tube. For example, the technology disclosed herein is applicable to a telescopic extension such as that described in EP 2,001,348, EP 1,333,747, EP 1,092,383 and EP 0,987,976.

FIGS. 1-6 show a telescopic extension 1 for a household appliance such as a vacuum cleaner, according to an embodiment of the technology disclosed herein. The extension 1 comprises an inner tube 2, an outer tube 3, a sleeve 4, constraining means 5 and 6, a push-slider 7 and an actuating device 8.

The inner tube 2 and outer tube 3 are sealingly slidable one inside the other. A seal is arranged between inner tube and outer tube. The tubes 2 and 3 are made, for example, of chrome-plated or externally painted sheet steel.

The inner tube 2 has a first end (or inlet end) 2' and a second end (or outlet end) 2". The output tube 3 has a first end (or inlet end) 3' and a second end (or outlet end) 3". The telescopic extension 1 therefore has as inlet end the inlet end 2' of the inner tube 2 and as outlet end the outlet end 3" of the outer tube 3.

The inner tube 2 preferably has a longitudinal groove 10 which is substantially parallelepiped shaped and has a bottom wall 11 in which a row of notches 12 is formed. Preferably, the notches 12 have a partially cylindrical shape and the constraining means 5 and 6 engage simultaneously with two of them. Preferably, the constraining means 5, 6 comprise cylinder pieces made of metal, for example steel. Alternatively, they could be made of plastic or a composite material. A portion of the inner tube is also shown in FIG. 7.

The sleeve 4 is preferably provided with a longitudinal cavity 15, an outer shoulder 14, a collar 13 and an inner ledge 16 (FIG. 7). The outer shoulder 14 has substantially preferably a parallelepiped shape and is aligned with the cavity 15. The cavity 15 has a bottom wall 18 which contains a recess 19 with a substantially parallelepiped shape and having end sides 39 and 40 and two rectangular slots 20 and 21 which guide the cylinder pieces 5 and 6 during the radial/axial movements which they perform in order to engage with a respective notch 12 of the inner tube 2 and disengage therefrom. The inner ledge 16 has a substantially parallelepiped shape and length the same as that of the sleeve 4 (less the outer shoulder 14 and the collar 13). The sleeve 4 is, for example, made of suitable plastic.

In the vicinity of its inner end 3', the outer tube 3 has a lateral opening 22 which extends as far as the end 3' and engages with the outer shoulder 14 of the sleeve 4 until the end 3' comes into contact against the collar 13 of the sleeve (FIGS. 5-7). Thus, the outer tube engages with the sleeve and is centered relative thereto, remaining flush with the collar 13 and with the shoulder 14 since the latter have a thickness more or less the same as that of the outer tube. Since the opening 22 in the outer tube 3 has a length greater than the shoulder 14 of the sleeve 4, it leaves free a small window 9, the function of which will be illustrated further below. The outer tube 3 has two square holes 48 with which projections 49 on the sleeve 4 engage (FIGS. 5, 6 and 7) so as to fix outer tube 3 and sleeve 4 to each other.

The push-slider 7 and a helical spring 24 are housed inside the longitudinal cavity 15 of the sleeve 4.

The push-slider 7 is preferably formed by a long, narrow and small-thickness rectangular plate 25 provided with eyelets 26, 27, 28, 29 and 30 and having at one end a projecting tongue 35 substantially at right angles. The tongue 35 projects from the window 9 left by the opening 22 of the outer tube when it is in contact against the collar 13 of the sleeve 4. The eyelet 26 has a rectangular shape and greater axis directed longitudinally, the four eyelets 27, 28, 29 and 30 have a rectangular shape and greater axis directed transversely. The eyelet 26 has end sides 37 and 38. The eyelets 27 and 28 have respective end sides 31 and 32 which are inclined in the opposite direction and the eyelets 29 and 30 have respective end sides 33 and 34 which are inclined in the opposite direction. The inclined sides 31, 32, 33 and 34 of the eyelets 27, 28, 29 and 30 exert a downwards thrust on the cylinder pieces 5 or 6, when they are situated outside of the notches 12 (FIGS. 3 and 4), as will be illustrated below. The push-slider 7 is, for example, made of suitable plastic and the plate 25 has a length of about 55 mm, width of about 8 mm and thickness of about 1.8 mm. The sides 31, 32, 33 and 34 of the eyelets are inclined with respect to the vertical at an angle of about 70.degree. Profitably, the push-slider 7 may be actuated by pushing it towards the inlet end of the outer tube or towards the outlet end of the outer tube. Both the two movements are capable to disengage the cylinder pieces 5 or 6 from notches 12 so that the outer tube can rotate with respect to the inner tube.

The helical spring 24 is seated in the eyelet 26 of the slider 7 and engages with the recess 19 in the sleeve 4. The spring 24 is mounted pre-stressed inside the eyelet 26 with its end turns which with one half make contact with the sides 37 and 38 of the eyelet 26 and with its other half make contact with the sides 39 and 40 of the recess 19.

According to the technology disclosed herein an actuating device 8 is provided, said device cooperating with the push-slider 7 and being configured so as to leave the constraining device free to move radially and come out of a notch of the inner tube. According to the technology disclosed herein, this actuating device extends from a position close to the inlet end of the outer tube into a position close to the outlet end of this outer tube so that it may be actuated using only one hand, i.e., the same hand used to grip the telescopic extension. The actuating device according to the technology disclosed herein may be designed in various ways, some of which will be described below.

In the extension 1, the plate 25 of the push-slider 7 has a thickness kept to a minimum owing to the presence of the eyelets 26, 27, 28, 29 and 30 which perform the functions indicated further above.

Figure 3:
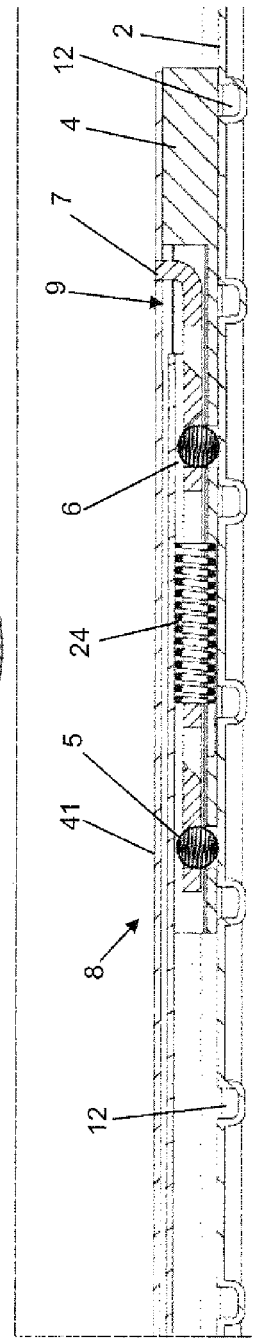
FIG. 3 shows partly the extension according to FIG. 1 in a first operating condition.
Figure 4:
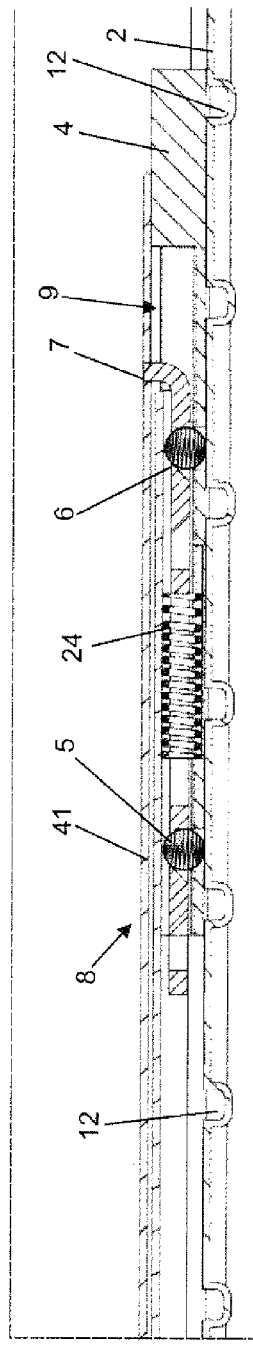
FIG. 4 shows partly the extension according to FIG. 1 in a second operating condition.

The actuating device 8 and the slider 7 assume a rest position, shown in FIG. 1, lying between two opposite active positions, shown in FIGS. 3 and 4, respectively, when the spring 24 is located in the initial assembled condition with both its end turns in contact with the sides 37 and 38 of the eyelet 26 and with the sides 39 and 40 of the recess 19. When the actuating device 8 and the slider 7 are in the rest position, the cylinder pieces 5 and 6 are forced inside the respective notches 12 of the inner tube 2. In this condition, the inner tube 2 and outer tube 3 are firmly joined together and form an extension 1 of pre-chosen length. In this position the two tubes cannot slide relative to each other.

In order to adjust the length of the extension 1, the actuating device 8 is pushed manually towards the inlet end 2' of the extension 1 or towards its outlet end 3", as shown by the arrows 45 and 46 (FIG. 1). The actuating device 8, via the tongue 35 which moves inside the window 9, brings the slider 7 into the right-hand active position (FIG. 3) or into the left-hand active position (FIG. 4). When the slider 7 assumes one of the two active positions, it leaves the cylinder pieces 5 and 6 free to move out of the notches 12 of the inner tube 2 and be displaced radially (and then longitudinally), guided by the slots 20 and 21 of the sleeve 4, so as to penetrate into its eyelets 27 and 29 (FIG. 3) or 28 and 30 (FIG. 4).

This allows the tube 2 to slide inside the tube 3 until the desired length of the extension 1 is reached.

When the actuating device 8 is released, the slider 7 pushes again the cylinder pieces 5 and 6 inside the notches 12 of the inner tube 2, via the inclined sides 31 and 33 of its eyelets 27 and 29 or 32 and 34 of its eyelets 28 and 30.

According to a first embodiment, the actuating device 8 comprises a cylindrical body 41 having an inner diameter substantially corresponding to the outer diameter of the outer tube 3. In fact, the inner diameter of the cylindrical body 41 is slightly greater than the outer diameter of the outer tube. Preferably, the cylindrical body 41 has a small thickness of between about 0.5 mm and about 5 mm, more preferably between about 0.5 mm and about 1.0 mm, and even more preferably between about 0.5 mm and about 0.8 mm.

The cylindrical body 41 has a lateral surface 41'. According to an embodiment of the technology disclosed herein, the lateral surface 41' of the cylindrical body 41 is not continuous and comprises at least one opening 41". According to a preferred embodiment of the technology disclosed herein, the lateral surface 41' comprises two opposite openings 41". The openings 41" may have a substantially elongated elliptical shape. In this way the two ends of the cylindrical body 41 have a continuous lateral surface 41', while in its central part the cylindrical body has only two slender lateral surface portions between the two opposite openings 41". This has an advantage in terms of a reduced weight of the cylindrical body 41. It also has an advantage in terms of material used and hence lower costs. Moreover, when the cylindrical body 41 is gripped by the user with one hand in its central part (or at any other section of the cylindrical body 41 where the two opposite openings 41" are present), the hand will also grip part of the outer tube exposed by the opposite openings 41". In this way the cylindrical body 41 is locked with respect to the outer tube of the telescopic extension. This aspect is very advantageous because the user may use the telescopic extension, pushing it towards a surface without the risk that the extension is shortened.

The important thing is in any case that the two ends of the cylindrical body 41 are rigidly connected together by means of the two slender lateral surface portions. In this way, since one of the two ends of the cylindrical body 41 is connected to the slider 7, the slider 7 may also be operated at the other end of the cylindrical body 41, i.e. the distal end. The edges of the openings 41" are preferably flared or rounded.

The cylindrical body 41 is preferably made of plastic but could also be made of metal, for example steel, aluminium or alloys thereof, or a composite material. The cylindrical body 41 could be made as one piece or could be made as two half-shells which can be joined together.

As shown in FIG. 6, the actuating device 8 preferably comprises a gripping device 50 suitable for being gripped by at least one portion of the hand of the person using the telescopic extension. According to an embodiment of the technology disclosed herein the gripping device 50 comprises an eyelet 52 with a hole 51 or a trigger. The user may insert a finger inside the hole 51 so as to move, pull or push, the actuating device (arrows 46 and 45 in FIG. 1) in such a way that the constraining device is left free to move radially and come out of a notch of the inner tube. In this way the inner tube is disengaged from the outer tube and may be slid relative to the outer tube in order to adjust the length of the extension.

Owing to the technology disclosed herein, by pulling the gripping device 50 and pushing at the same time the outer tube 3 downwards while the brush rests on the ground, the telescopic extension 1 is shortened in that the inner tube retracts at least partially inside the outer tube. All of this is done using one hand, the hand which holds the outer tube 3 or which holds a grip fixed thereto; a finger of the same hand is able to cooperate with the gripping device in order to release the constraining device.

The telescopic extension of the technology disclosed herein is also able to be lengthened using one hand. In fact, when the vacuum cleaner is in use, the brush is kept on the ground by the suction effect as well as by the weight of the brush and the telescopic extension. In order to lengthen the telescopic extension, the outer tube is pulled away from the ground, while at the same time, using a finger of the same hand, the actuating device is pulled/pushed in order to free the constraining device. When the pulling force on the constraining device is released, the outer tube is locked again relative to the inner tube. If necessary, the brush may be (lightly) held in position using a foot so that it does not lift up from the ground.

Figure 13A:
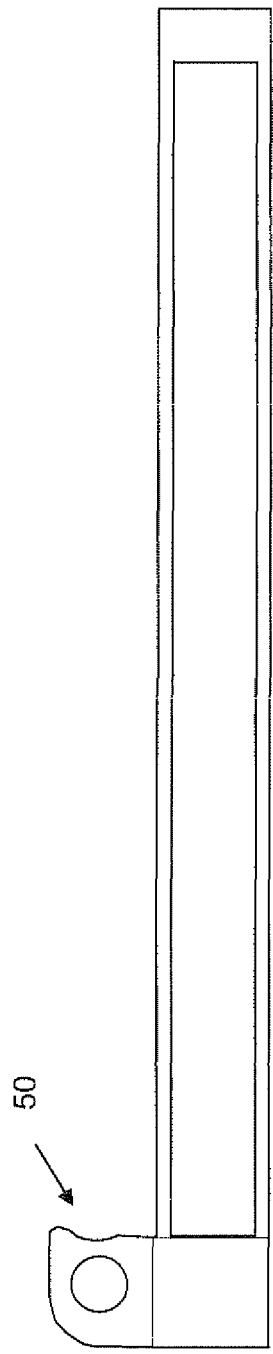
FIGS. 13a, 13b and 13c show alternative embodiments of the actuating device.
Figure 13C:
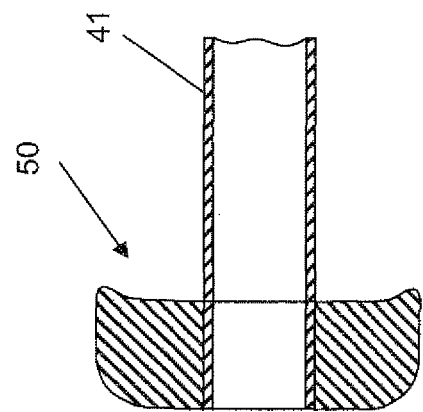
Figure 13B:
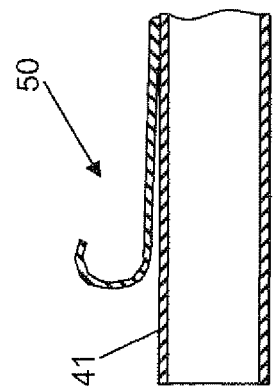

The trigger 50, in addition or as an alternative to the hole 51, could have a curled part (FIG. 13b) shaped in the manner of a semi-circle or the like so as to cooperate with a finger. In addition or as an alternative to the trigger 50 a rim projecting from the edge of the cylindrical body (FIG. 13c) could be provided.

According to another embodiment (FIG. 13a), the actuating device 8 could comprise a first annular band in the vicinity of the inlet end 3' of the outer tube 3 and a second annular band in the vicinity of the outlet end 3" of the outer tube 3, the two bands being rigidly connected by means of one or more bars. The bands could also not have a circular cross section and be in the form of open rings. A trigger according to any one of the variants described above and partially illustrated in the drawings could be attached to the annular band on the outlet end 3".

Generally, according to the technology disclosed herein, a connection using the device (for example the slider 7) is envisaged, this allowing the constraining device to be freed so that said slider (or other device) may also be operated while the user grips the outlet end 3" of the outer tube or a grip which is situated in the vicinity of this outlet end 3". This connection may be performed also in other ways. For example, it may be performed using a transmission wire inside or outside the outer tube 3. The transmission wire could be seated inside a longitudinal niche in the outer tube.

In practice, the actuating point of the slider 7 moves a distance typically greater than about 30 cm, preferably of about 40 cm.

The method of assembling the telescopic extension 1 comprises the following steps:

i. the sleeve 4 is fitted onto the inner tube 2, so that its inner ledge 16 engages with the longitudinal groove 10 of the inner tube;

ii. the constraining cylinder pieces 5 and 6 are inserted through the slots 20 and 21 of the sleeve 4 and positioned inside two respective notches 12 of the inner tube 2;

iii. The spring 24 is mounted pre-stressed inside the eyelet 26 of the push-slider 7;

iv. the slider is seated inside the longitudinal cavity 15 of the sleeve 4 so that the spring 24 also engages with the recess 19 of the sleeve 4, such that the slider 7 is correctly positioned in the rest position;

v. the outer tube 3 is fitted onto the sleeve 4 engaging its lateral opening 22 and its square holes 48 with the outer shoulder 14 and with the projections 49 of the sleeve, respectively, until its end 23 makes contact against the collar 13 of the sleeve;

vi. in this position the tongue 35 of the slider 7 projects outside of the window 9 left free by the opening 22 and the actuating device 8 may be forced relative thereto by lightly pressing the tongue radially inwards. Obviously, the actuating device 8 is provided with a small hole having a size and shape corresponding to the size and shape of the cross section of tongue 35.

The invention claimed is:

1. A telescopic extension comprising:

a) an inner tube;

b) an outer tube, wherein said inner tube and said outer tube are telescopically slidable with respect to each other, wherein said inner tube comprises a plurality of deformations of predefined shape on its outer surface;

c) a constraining device which is configured so as to block sliding of the inner tube with respect to the outer tube when said constraining device at least partially engages one of said deformations;

d) a slider and elastic means, wherein said slider cooperates with said constraining device by means of said elastic means;

e) an actuating device operatively connected to said slider, wherein said actuating device extends over at least half the length of said outer tube, wherein said actuating device comprises a substantially cylindrical body fitted on at least part of the outer surface of said outer tube; and f) wherein said substantially cylindrical body has a lateral surface which corresponds to a lateral surface of said outer tube, wherein said lateral surface of the substantially cylindrical body comprises at least one opening positioned to expose a surface of the outer tube whereby grip of user on the substantially cylindrical body may also contact the exposed surface of the outer tube and lock the cylindrical body with respect to the outer tube.

2. The telescopic extension according to claim 1, wherein said actuating device extends over at least 80% of the length of said outer tube.

3. The telescopic extension according to claim 1, wherein said lateral surface of the substantially cylindrical body comprises two openings which are arranged symmetrically with respect to an axial plane of said outer tube.

4. The telescopic extension according to claim 3, wherein each of said two openings is elongate in a longitudinal direction.

5. The telescopic extension according to claim 1, wherein said actuating device comprises a first annular band which is arranged at the inlet end of the outer tube and is operatively connected to said slider and a second annular band which is arranged at the outlet end of the outer tube, the first and second annular bands being connected by one or more bars.

6. The telescopic extension according to claim 1, wherein said actuating device also comprises a gripping device capable of being engaged by at least one portion of a hand of the person using the telescopic extension.

7. The telescopic extension according to claim 6, wherein said gripping device comprises one or more of the following: a buttonhole, a ring, a trigger, an eyelet, or a rim projecting radially outwards.

8. The telescopic extension according to claim 1, wherein said outer tube is a tube having a cross section with a substantially constant diameter.

9. The telescopic extension according to claim 1, wherein said substantially cylindrical body has a thickness of between about 0.5 mm and about 5 mm and a diameter which is substantially constant through its length.

10. The telescopic extension according to claim 9, wherein the outer diameter of the outer tube substantially corresponds to the inner diameter of the substantially cylindrical body.

11. The telescopic extension according to claim 1, wherein the substantially cylindrical body is formed by two half substantially cylindrical shells which are connected together.

12. A household appliance comprising a telescopic extension according to claim 1.

* * * * *